US005233346A

United States Patent [19]
Minerd et al.

[11] Patent Number: 5,233,346
[45] Date of Patent: Aug. 3, 1993

[54] APPARATUS AND METHOD FOR ELECTRONICALLY PROGRAMMING NODAL IDENTIFICATIONS

[75] Inventors: Timothy Minerd, Pittsford; Robert Chapin, Rushville, both of N.Y.

[73] Assignee: Xerox Corporation, Stamford, Conn.

[21] Appl. No.: 625,095

[22] Filed: Dec. 10, 1990

[51] Int. Cl.$^5$ ............................................. H04Q 1/00
[52] U.S. Cl. ........................ 340/825.52; 340/825.22; 340/825.07; 370/85.1; 307/40
[58] Field of Search ................ 340/825.22, 825.52, 340/825.07, 825.05, 310 R; 370/85.1; 307/38–40; 361/170, 171; 318/16, 49, 51

[56] References Cited

U.S. PATENT DOCUMENTS

| | | | |
|---|---|---|---|
| 4,232,294 | 11/1980 | Burke et al. | 364/200 |
| 4,437,157 | 3/1984 | Witalka et al. | 364/200 |
| 4,604,620 | 8/1986 | Oho et al. | 340/825.52 |
| 4,646,236 | 2/1987 | Crockett et al. | 364/200 |

Primary Examiner—Donald J. Yusko
Assistant Examiner—Michael Horabik
Attorney, Agent, or Firm—Oliff & Berridge

[57] ABSTRACT

A plurality of input/output connector modules are located along a time multiplex bus. Each module has a plurality of programmable cells comprised of digital components. Each cell can be electronically programmed to receive one bit of information. These bits of information are used by each module to determine the address and input/output configuration assumed by the module. Programming data is sent via a serial input data (SID) line to the programming cells. The SID line has a plurality of delays which are located between the modules. The delays allow all of the programming cells of one module to be programmed before the next module receives the data along the SID line. The delays are created by the intrinsic resistance of the SID line and capacitors connected to the SID line which cause a delay in the programming data. The SID line is also clamped to ground out the programming signals after each cell has been programmed.

17 Claims, 5 Drawing Sheets

APPARATUS AND METHOD FOR ELECTRONICALLY PROGRAMMING NODAL IDENTIFICATIONS

CROSS REFERENCES

The present application is one of a series of copending applications containing related technical subject matter. The related applications have the following identifications:

U.S. Pat. No. 5,044,964; issued on Sep. 3, 1991.
U.S. Pat. No. 5,037,308; issued on Aug. 6, 1991; and their disclosures are herein incorporated by reference.

BACKGROUND OF THE INVENTION

1. Field of the Invention

The present invention pertains to the programming of nodes, and more particularly to the programming of nodes by the use of electronic methods and hardware.

2. Description of Related Art

The prior art discloses a number of references which teach methods for addressing devices along a communications link. U.S. Pat. No. 4,232,294 to Burke et al. discloses a method and apparatus for rotating priorities between stations sharing a communications channel. Each station is provided with a different time delay by a cyclic counter so that conflicts within the channel are minimized. These time delays determine which station receives control of the bus and can be rotated to give every station equal access. U.S. Pat. No. 4,437,157 to Witalka et al. discloses a dynamic subchannel allocation process. A means is provided to store a particular arrangement of nodes in a register. This register can be altered at any time to change an allocation scheme. U.S. Pat. No. 4,646,236 to Crockett et al. discloses a pipelined control apparatus having a means to initialize a system which uses a software routine. Once reset, the system can be reconfigured to any set-up.

Figure 1:
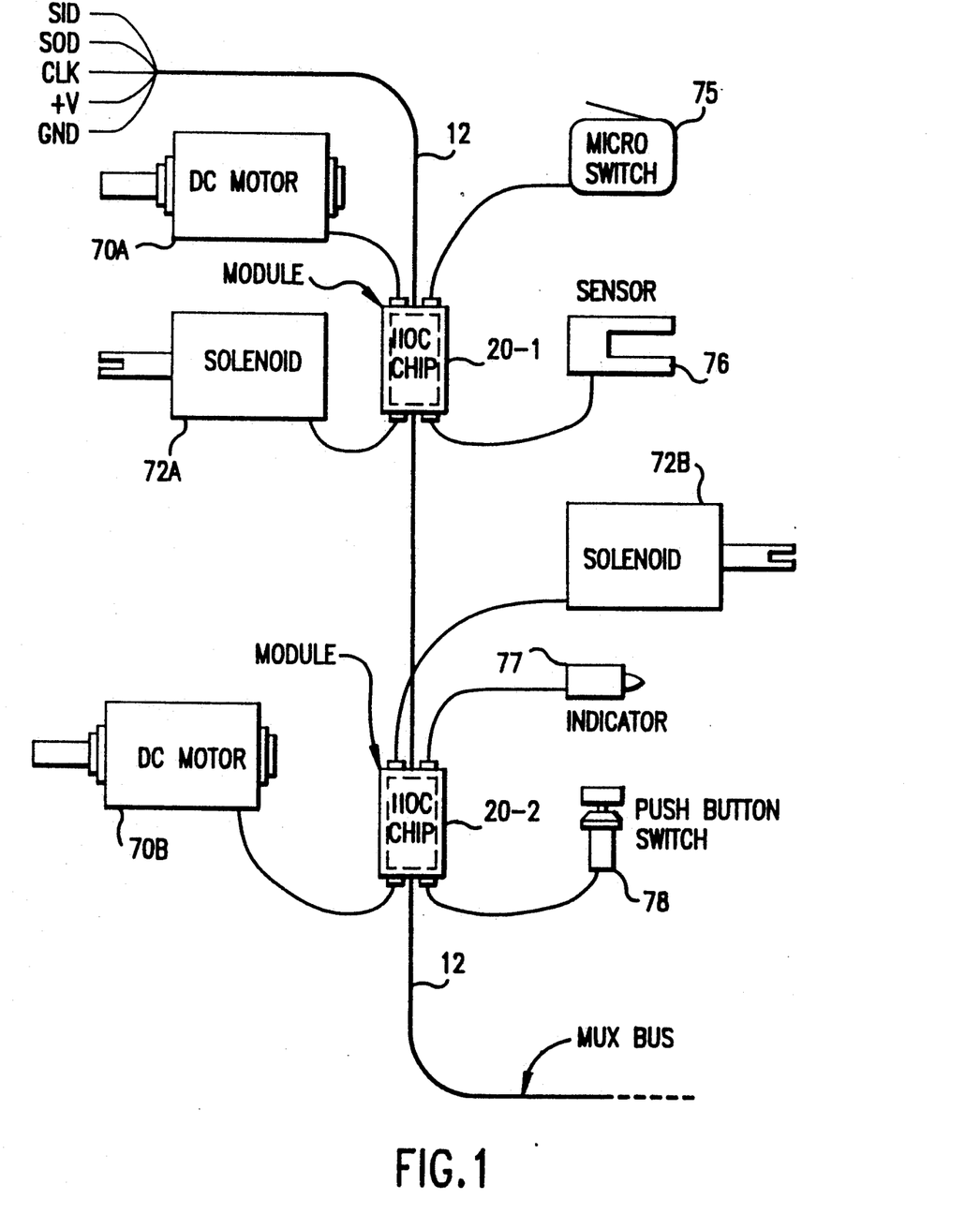
FIG. 1 is a diagram showing the overall structure of the bus and the modules in the network.

In typical electrical mechanical devices, hundreds of wires can be necessary to electrically connect electrical loads, e.g. motors, solenoids, sensors, switches etc., with a control mechanism. Identical programmable modules which interface with electrical loads along a bus can relieve the need for an excess of interconnecting wires and an excess of unique fixed address modules. FIG. 1 illustrates programmable modules (e.g. modules 20-1 and 20-2) located along bus 12. Module 20-1 is connected to DC motor 70A, solenoid 72A, microswitch 75 and sensor 76. Module 20-2 is connected to DC motor 70B, solenoid 72B, indicator 77 and push button switch 78. The modules are programmed to receive signals from the loads and to send signals to the loads. For example, module 20-1 may receive a signal from bus 12 which is relayed to DC motor 70A and from sensor 76 which is relayed to another module located along bus 12. In such a manner, the modules located along bus 12 perform input and output operations.

In U.S. Pat. Nos. 5,044,964 and 5,037,308, programming of identical programmable modules (i.e. the programming of the input nodes of the IC chip of the modules) is undertaken by mechanical means. This mechanical programming is accomplished by puncturing or breaking printed wiring board (PWB) runs or by pulling down or grounding programming fingers which connect to the inputs of the IC chip of a module. Both types of mechanical programming are inexpensive, but the first procedure of breaking the PWB runs results in a device which cannot be reprogrammed while the second method requires the fingers to be pulled up or down for reprogramming. In either case, human intervention for programming is necessitated.

Therefore, a need exists for a system which makes possible the electronic programming of address and configuration information to a plurality of input/output connector modules located along a time multiplex bus, the system allowing the electronic programming and reprogramming of any number of modules located along the bus.

SUMMARY OF THE INVENTION

Accordingly, it is an object of the present invention to provide a method and apparatus for electronically programming and reprogramming a plurality of input/output connector modules sequentially located along a time multiplex bus, each module being programmed to assume an address and input/output configuration.

Yet another object of the present invention is to provide programming circuitry which is easily interfaced with the input nodes of a programmable module, the programmable circuitry being comprised of standard digital components thus providing a low-cost characteristic to the invention.

Yet another object of the present invention is to provide time delays between the modules located on a serial input data line of the multiplex bus so that the programming information contained in the serial input data line can be utilized by a plurality of modules.

It is another object of the present invention to provide a clamping circuit which grounds out a serial input data line in order to prevent data from propagating down the multiplex bus.

These and other objects and advantages of the present invention are achieved by a network for electronically programming a plurality of input/output connector modules serially located along a time multiplex bus. The programming signals are conveyed along a serial input data (SID) line of the time multiplex bus and delayed between modules so that the programmable cells of one module receive the bits of programming information before the programming information advances to the next module along the SID line. This time delay is achieved by one of several methods that include using the intrinsic resistance in the SID line and a capacitor coupled to the SID line, or using the intrinsic capacitance of each programming node.

Each module is comprised of a plurality of programmable cells which are comprised of a plurality of digital components. Each programmable cell is programmed by receiving and latching a logic 1 or a logic 0 which is then outputted to a programmable input of an IC chip which controls the input/output functions of each module. Each programmable cell is connected to the SID line from which it receives programming information. By utilizing a plurality of such programmable cells, the IC chip can assume any number of addresses and input/output configurations.

One programmable cell is a start programming cell and must receive a predetermined signal before the programming of the programmable cells of each module can proceed. The last programmable cell of each module is a stop programming cell. The stop programming cell must receive a predetermined signal to indicate that all the programmable cells of the module have been properly programmed. The stop programmable cell of one module may correspond to the start programmable cell of the next downstream module.

The cells used to program the address and input/output configuration are connected to and located between the start and stop programming cells. A serial output data (SOD) line of the bus is connected to the IC chip of each module and the programmed information is relayed along the SOD line to a microprocessor. If the relayed information does not properly correspond with the inputted programming signal, each cell will receive a reset signal and the cells will be reset to await the next programming signal.

BRIEF DESCRIPTION OF THE DRAWINGS

These and other objects and advantages of the present invention will be described in detail herein with reference to the preferred embodiment and the following figures, wherein.

DETAILED DESCRIPTION OF THE PREFERRED EMBODIMENT

Referring now to the drawings, where like reference numerals designate identical or corresponding parts throughout the several views, and more particularly to FIG. 1 thereof, a multiplex bus 12 is shown with 5 wires in it: SID, SOD, CLK, +V, GND (i.e., serial input data, serial output data, clock, power and ground, respectively). Each of these lines is connected to each module 20-1, 20-2 in the multiplex bus 12. Each module can be programmed for a certain input/output configuration. The actual configuration and address of each module 20-1 and 20-2 is stored in the IIOC chip 16 provided in each module. For instance, in module 20-1, the input/output configuration would be for two inputs and two outputs. The inputs are a microswitch 75 and a sensor 76. The outputs are a DC motors 70A and a solenoid 72A.

Module 20-2 would be configured as a one input, three output configuration. The outputs would be a DC motor 70B, a solenoid 72B, and an indicator 77. Pushbutton switch 78 is the only input. Each of these modules is connected to the multiplex bus 12 in a serial manner, one after the other.

Figure 2:
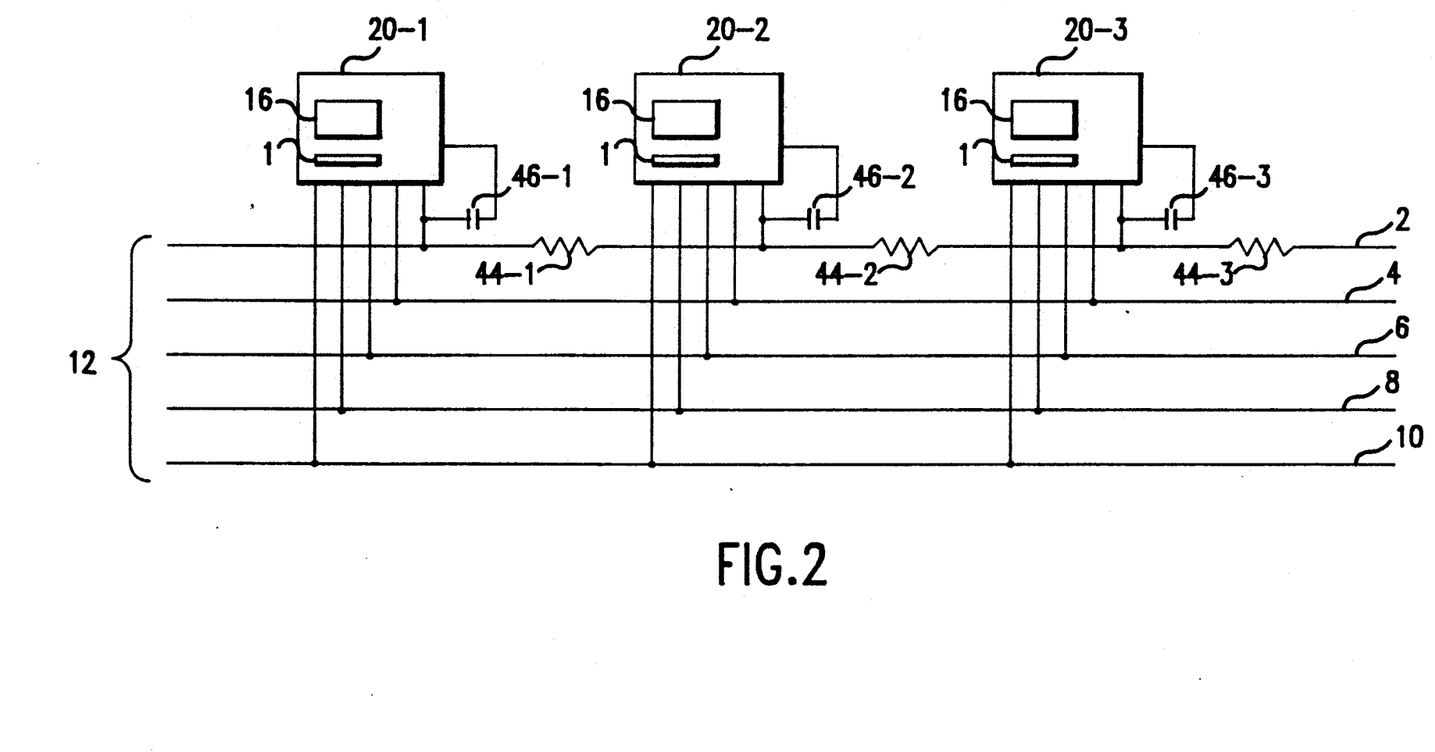
FIG. 2 is a more detailed drawing of the connections between the modules and the bus.

Now referring to FIG. 2, a more detailed diagram of the connection between the modules and the bus is shown. The bus has five lines as described above shown connected to three modules 20-1, 20-2 and 20-3. Also shown within each module is an IIOC chip connector 16 which stores the input/output configuration of the module and the address of that module. The resistors 44-1, 44-2 and 44-3 on the SID line 2 represent an inherent resistance within that wire and are not actual resistors. These resistors, when coupled with the capacitors 46-1, 46-2 and 46-3, create a delay between each module in order to allow programming to take place using only one line, the SID line 2. The delay between the modules provides a method of programming a first module on a serial multiplexed bus before any programming signals reach a second downstream module. The delay period created by the delay, must be greater than the time required to program one of the programming cells within a module since each cell will ground out the SID line individually before any data can pass through the delay. In addition, the delay provides a method of electronically programming a series of modules on a serial multiplex bus using a single data line, SID. The use of only one line greatly decreases the amount of wiring needed by the system. The delays are always present in the SID line, but do not affect normal module operation because the delays are relatively short. Connections between the modules and the rest of the lines within the multiplex bus 12 are shown as lines 4, 6, 8 and 10 representing, for example, SOD, CLK, +V and GND, respectively. Once a module is programmed, the address of that module is sent out over the SOD line 4 which routes the address back to a logic circuit to verify that the module has been correctly programmed.

Each module 20-1, 20-2, 20-3 has a plurality of programming cells 1-A, 1-B, . . . ,1-N which are composed of digital components. Each cell is electronically programmed by receiving and latching a logic 1 or a logic 0 from the SID line 2 which represents one bit of the module's address or input/output configuration. Each cell clamps the SID line 2, after receiving its data, to ensure that the data does not propagate down the SID line 2 to another module. To accomplish this clamping, a delay, which is greater than the time required to receive, latch and clamp data by the programming cell, prevents the data from propagating down the SID line 2 because the SID line 2 is clamped.

Figure 3:
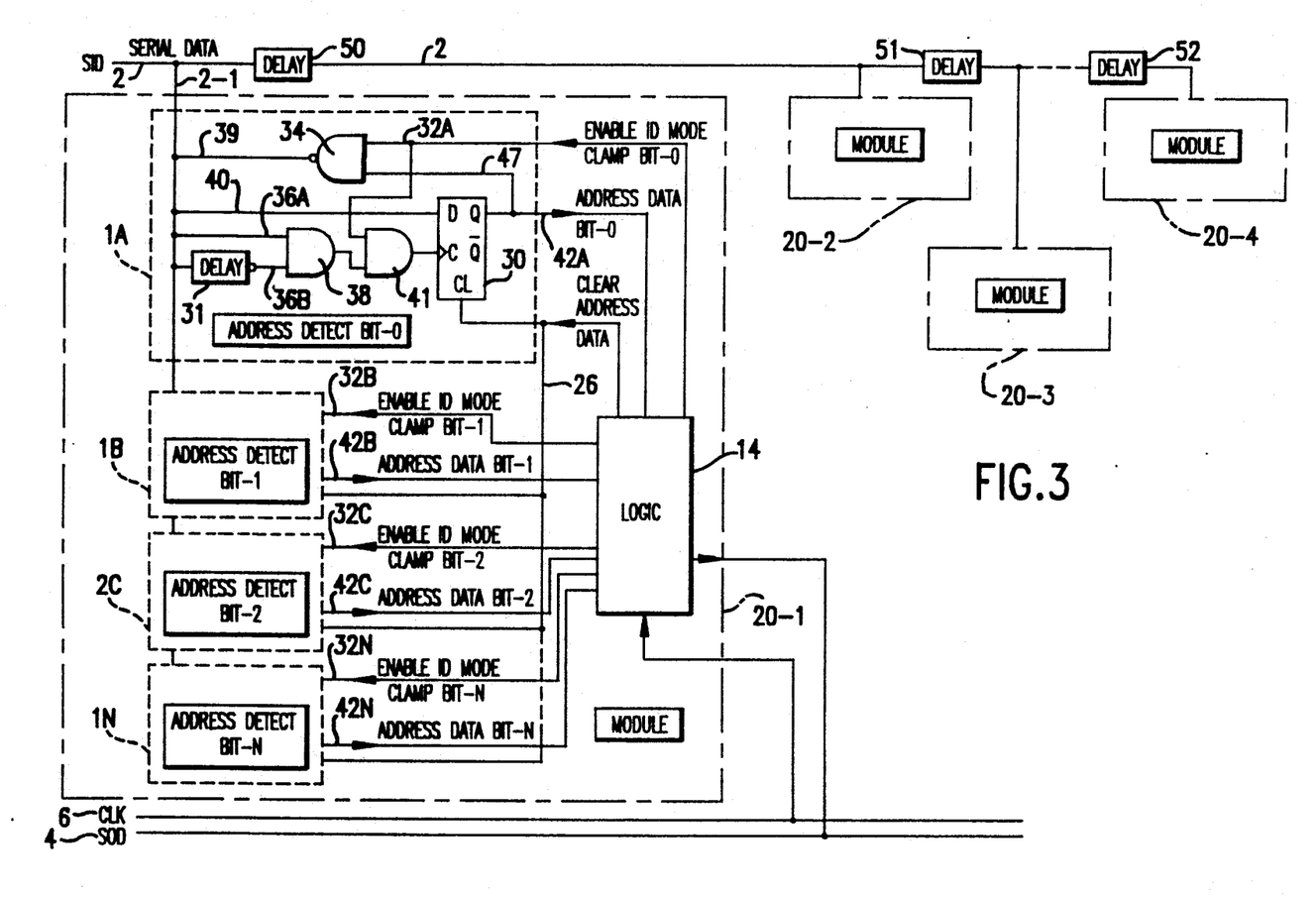
FIG. 3 is a general circuit schematic of one embodiment of the present invention.

With reference to FIG. 3, a general circuit schematic of one embodiment of the present invention is shown. In this embodiment, each programming cell 1A, 1B, . . . 1N has separate programming circuitry to clarify the operation, in this embodiment, of the present invention. The serial input data line 2 (SID) is connected to the first module 20-1 and similarly to each proceeding module 20-2, 20-3, etc. The programming circuitry within each module is identical and hence only the actual digital components and operation of the module 20-1 will be described below. Between each module is a delay 50 which represents a time delay created by a capacitor 46-1 and the resistance of the SID line, which is on the order of 400 ohms per foot, shown symbolically as a resistance 44-1 in FIG. 2. The delay 50 must be greater than the time necessary to program a single programming cell IA, which is approximately 40 nanoseconds. The delay 50 delays the data long enough so that each programming cell 1A . . . , 1N can clamp (ground) the SID line 2 to prevent the data from reaching the downstream modules.

The clock (CLK) signal 6 and the serial output data (SOD) line 4 from the multiplex bus 12 are connected to a logic block 14. The logic block 14 uses the clock signal 6 to generate sequential enable signals 32A, 32B, 32C, . . . 32N for each programming cell, and a common clear signal 26 which is connected to each programming cell. In addition, the output line 42A, 42B, . . . 42N from each programming cell is processed by the logic block 14 which outputs the addresses and input/output configurations over the SOD line 4.

Each module, such as 20-1, comprises a number of programming cells 1A, 1B, 1C, . . . 1N. The number of programming cells depends on the length of the data needed to program the address of the module and the input/output configuration of that module. Generally, 8 bits are used for programming which means 8 programming cells are required. The first programming cell 1A of each module is called a start programming cell and must be programmed with a 1 before any further programming of the module can occur. The last programming cell 1N of a module is known as a stop programming cell and must also be programmed with a 1 to end the programming mode of the particular module.

Figure 5:
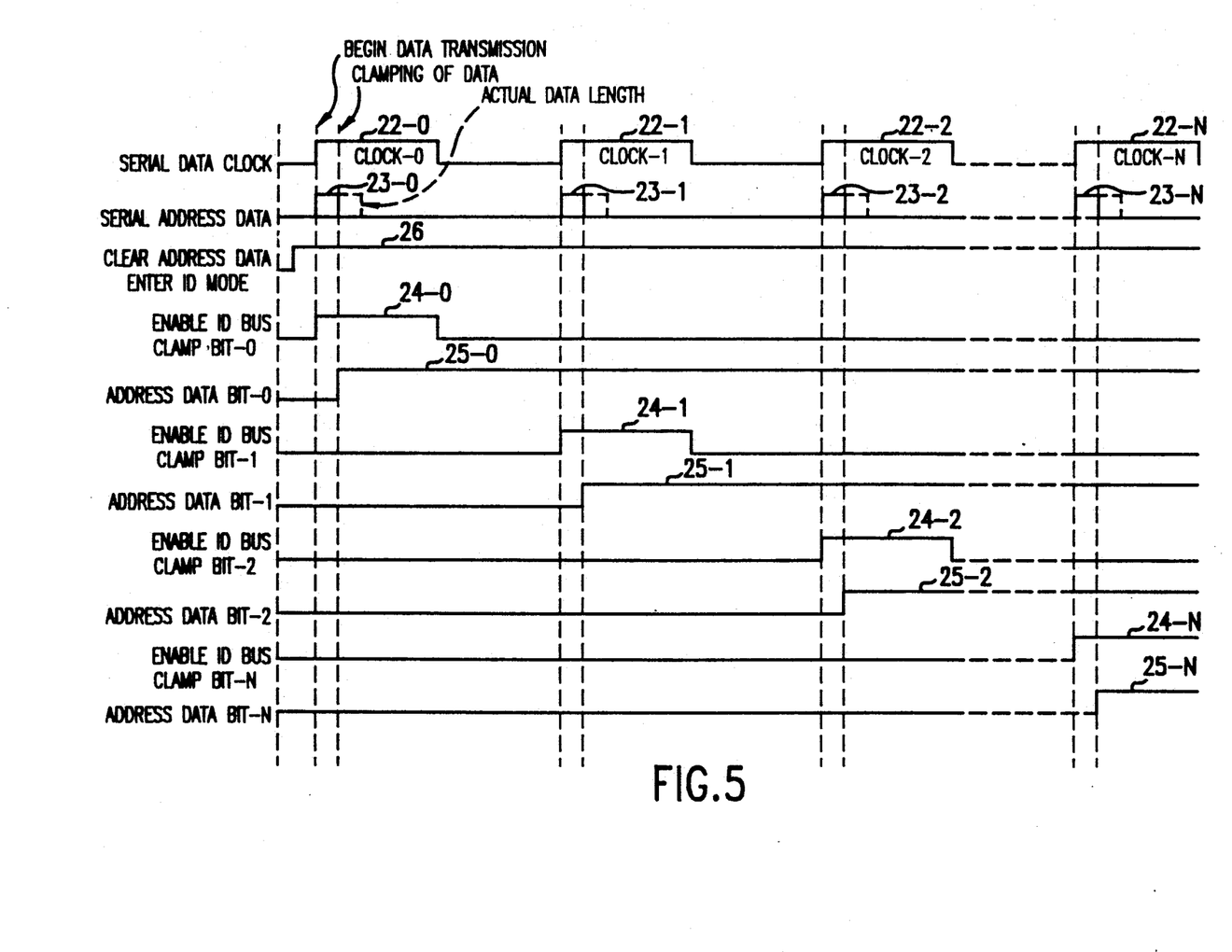
FIG. 5 is a timing diagram showing the operation of the circuit shown in FIG. 4.

The operation of programming each programming cell of a module and in particular to programming cell 1A of module 20-1 will now be described with reference to FIG. 3 and FIG. 5, which is a timing diagram of the circuit shown in FIG. 3. When the circuitry is first turned on, each module's programming mode is enabled and will remain enabled until a logic 1 is programmed into the stop programming cell 1N. In addition to the programming mode being enabled, a clear signal 26 from the logic block 14 is generated to clear all of the modules latching D flip-flops 30.

A data bit 23-0 will enter the programming cell 1A from the SID line 2. As the data bit enters the cell 1A through the D flip-flop 30, an enable signal 32A is generated by the logic block 14 and connected to an input of a NAND gate 34. The other input of this gate 34 is connected to the Q output of the D flip-flop 30. When both inputs of the NAND gate 34 are high, the output is low which clamps (grounds) the SID line 2 until the next data bit. The clamping of the SID line 2 takes place approximately 20 nanoseconds after data is first received by the cell. The enable signal 32A is also connected to an AND gate 41 which enables the clock input (CK) of the D flip-flop 30 only during times when the cell 1A is enabled. The enable signal 32A stays high until the end of the clock signal 22-0.

The data bit on the SID line 2 is input to the D input 40 of the D flip-flop 30, and to two clock lines 36A, 36B. Line 36A is directly connected to the input of an AND gate 38. Line 36B inverts and delays the data signal, using an inverting delay 31, and then connects the output of the inverting delay 31 to the other input of the AND gate 38. The output of AND gate 38 is a shortened pulse (approximately 20 nanoseconds long) which is connected to an input of the AND gate 41. When this gate is enabled by the enable signal 32A, a clock pulse is sent to the clock input (C) of the D flip-flop 30. The clock pulse enables the D flip-flop 30, which passes the signal on the D input 40 through to the output 42A. This output 42A is feed back over line 47 to ground out the SID line 2 as described above. Simultaneously with the grounding of the SID line 2, an address bit is generated on line 32A and is connected to the logic block 14.

Each cell within the module 20-1 is similarly programmed with either a 1 or a 0 until the entire module has been programmed. The start cell IA receives data bit 23-0, cell 1B receives data bit 23-1, a third programming cell receives data-bit 23-2. This continues through each programming cell until cell 1-N receives a stop bit 23-N.

Figure 4:
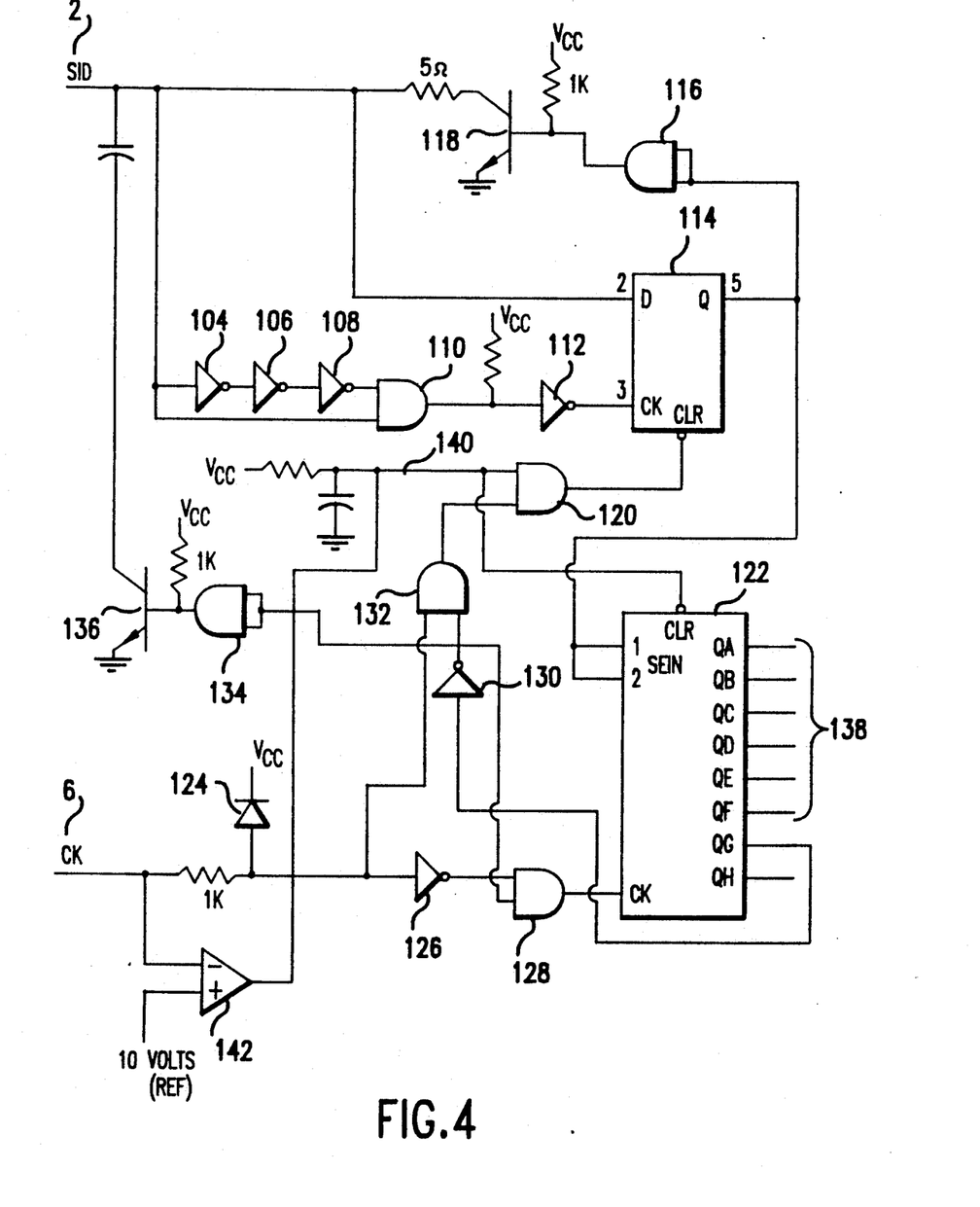
FIG. 4 is a circuit schematic of a preferred embodiment of the present invention.

Now, with reference to FIG. 4, a detailed circuit diagram of the preferred embodiment of a module 20-1 is shown. In this embodiment, a single shift register circuit handles the programming of all of the programming cells 1A, . . . ,1N. The SID line 2 of the bus 12 is operatively connected to three inverters, 104, 106, 108 and one input of an AND gate 110. The output of the three inverters, 104, 106, 108 is connected to the other input of the AND gate 110. The three inverters 104, 106, 108 create a delay and invert the signal from the SID line 2. The delay is caused by the intrinsic delay which is present in any logic gate. The output of the AND gate 110 is a shortened (approximately a 20 ns long pulse from an approximately 2 micro second long unclamped SID signal) clock pulse which is connected to an inverter 112 which inverts the signal. The output of the inverter 112 is connected to the clock input (CK) of a D flip-flop 114.

The D flip-flop 114 is a logic latch, which is triggered by a positive edge of a clock pulse and whose purpose is to acquire each bit of programming data as it is sent over the SID line 2. The D input of the flip-flop 114 is connected to the SID line 2 directly. The D flip-flop 114 is cleared after every clock pulse by a low signal to the clear input, which will be described below in more detail. When a clock pulse arrives at the clock input, the flip-flop 114 outputs a signal on the Q output which is equal to the value of the D input which represents the programming data that was being sent.

The output of the flip-flop 114 is connected to both inputs of a two input open collector AND gate buffer 116 and to two inputs of a serial-in parallel-out 8-bit shift register 122 whose function is to collect the programming data bits from D flip-flop 114 and shift them into the correct output position as shown in Table 1, and whose operation will be described below.

When a logic 1 is output from the flip-flop 114, the AND gate 116 outputs a 1. The output of the AND gate 116 is connected to the base of a transistor 118. A high signal, 1, at the transistor's base causes the transistor 118 to conduct which grounds out (clamps) the SID line 2 until the flip-flop 114 is reset by the clock 6 through two AND gates 132,120 or outputs a zero. This clamping of the SID line 2 ensures that the programming signals for this module cannot be received, for example, by a next in line module 20-2 of the bus 12.

When a low (0) signal data bit is sent over the SID line 2, a low signal (0) is output from AND gate 110, which is connected to the inverter 112 which outputs a high (1) signal. The inverter output is connected to the clock input CK of the D flip-flop 114 which is not affected by a "1" signal because the D flip-flop 114 requires a positive-edge of a clock pulse in order to latch a data bit. Since no action is taken by the D flip-flip 114, the Q output is 0 which is connected to the AND gate 116 which outputs a low (0) signal which in turn keeps the clamping transistor 118 off.

The shift register 122 will receive the Q output of 0 from the D flip-flop 114 and shift it into the shift register 122 when a clock pulse on the clock line 6 is detected. Thus, a 0 is entered in the output lines 138 as either an address bit or as an input/output configuration bit for the module.

The serial-in parallel-out shift register 122 is cleared once during power-up which will be described below in more detail. The outputs 138 of the shift register 122 are connected to the IIOC chip 16 which outputs the address and the input/output configuration of the module 20-1. Table 1, shown below, shows the outputs 138 of the shift register 122 after various clock pulses.

TABLE 1

|  | initial | 1 | 2 | 3 | 4 | 5 | 6 | 7 |
|---|---|---|---|---|---|---|---|---|
| $O_A$ | 0 | start/(stop) | ad0 | ad1 | ad2 | ad3 | io1 | io2 |

TABLE 1-continued

| | initial | 1 | 2 | 3 | 4 | 5 | 6 | 7 |
|---|---|---|---|---|---|---|---|---|
| $O_B$ | 0 | 0 | start/(stop) | ad0 | ad1 | ad2 | ad3 | io1 |
| $O_C$ | 0 | 0 | 0 | start/(stop) | ad0 | ad1 | ad2 | ad3 |
| $O_D$ | 0 | 0 | 0 | 0 | start/(stop) | ad0 | ad1 | ad2 |
| $O_F$ | 0 | 0 | 0 | 0 | 0 | start/(stop) | ad0 | ad1 |
| $O_F$ | 0 | 0 | 0 | 0 | 0 | 0 | start/(stop) | ad0 |
| $O_G$ | 0 | 0 | 0 | 0 | 0 | 0 | 0 | start/(stop) |
| $O_H$ | — | — | — | — | — | — | — | — |

AD0–AD3 represent the address of the module while IO0–IO2 represent the input/output configuration of the module. Output $Q_g$ of the shift register 122 is connected to an inverter 130. The output of the inverter 130 is connected to several logic gates including an AND gate 132, an AND gate 134 and an AND gate 128. $Q_g$ output of the shift register disables the D flip-flop 114 and the shift register 122 once the start/stop bit, which is a 1, has been shifted into $Q_g$.

The clocking and clearing of the D flip-flop 114 and the shift register 122 are completed using the clock signal (CK)6 of the multiplex bus 12. The resistor and diode 124 connected to the clock line 6 limit the clock's normal voltage of 15 volts to 5 volts at the input to inverter 126 which is compatible with the digital logic. The clock signal is inverted by an inverter 126 and then connected to an input of an AND gate 128.

The output of the AND gate 128 is connected to the clock input of the shift register 122. The other input of the AND gate 128 is connected to the output of the inverter 130 which disables both the D flip-flop 114 and the shift register 122 when the start/stop bit has been shifted into $Q_g$ and programming is complete.

The clock line 6 is additionally connected to an input of an AND gate 132. The other input of the AND gate 132 is connected to the output of the inverter 130 whose input is connected to the $Q_G$ output of the shift register 122. The output of the AND gate 132 is connected to an input of another AND gate 120. The other input of the AND gate 120 is connected to a power supply voltage line 140 which will be a 1 at all times except during power up. This line 140 is also connected to the shift register's clear input (CLR) which clears the shift register 122 on a low signal, which occurs only during power up. The output of the AND gate 120 is connected to a clear input (CLR) of the D flip-flop 114 in order to clear the D flip-flop 114 after every clock pulse and disable the D flip-flop 114 after programming has been completed.

The output of the inverter 130, which is normally a logic 1 until programming is completed (start/stop bit received), is connected to both inputs of an AND gate 134. The output of the AND gate 134 drives the base of a transistor 136 and causes it to conduct until the module has been programmed. The transistor 136 enables the capacitor 46-1 (FIG. 2) to create a delay and remove the delay after programming.

If the module of FIG. 4 has been incorrectly programmed, a 15 volt reset signal is sent over the clock line 6. The clock line 6 is connected to an operational amplifier 142 which operates as a voltage comparator. During normal programming, the voltage comparitor 142 outputs a positive 15 volts and does not affect the programming operations. When a reset signal on the clock line CK6 is input into the voltage comparitor 142, the comparitor outputs 0 volts which in turn pulls line 140 to 0 volts, which in turn resets the D flip-flop 114 and the shift register 122 so that new data bits can be programmed into the module.

Each module 20-1, 20-2, 20-3, etc. would have a similar circuit which would control the programming of each module in a similar way.

The foregoing descriptions of the preferred embodiment and the second embodiment are intended to be illustrated and not limiting. Modifications and variations can be achieved by those skilled in the art as a result of the above techniques. It is therefore to be understood that the invention may be practiced otherwise than as specifically described herein and still be in the scope of the appended claims.

What is claimed is:

1. An electronic programming system for transmitting programming signals to at least one of a plurality of input/output connector modules located along a multiplexed bus in a serial fashion, each connector module having a plurality of programming cells which are connected to each other and to the bus, said system comprising:
   enabling means within each cell for enabling each cell to receive the programming signals to program each cell;
   clamping means within each cell for grounding out the programming signals after programming of each cell; and
   delay means between each of the plurality of connector modules for delaying the transmission of the programming signals from a first module to a second downstream adjacent module for a delay time period that is at least as great as a programming time period required by the enabling and clamping means to program each cell of the first module.

2. The system of claim 1, further comprising:
   a latch means located within each cell for storing said programming signals before said programming signals are clamped by said clamping means.

3. The system of claim 2, further comprising:
   a reset means, located within each module and connected to said latch means for resetting said latch means upon power-up.

4. The system of claim 2, further comprising:
   verification means for verifying the programming signals received by each cell; and
   reset means located within each module and connected to said latch means for resetting said latch means when the programming signals received by each cell are not verified by the verification means.

5. The system of claim 4, further comprising:
   a means within each cell, connected to said bus, for delaying and shortening the duration of a serial data clock pulse received by said latch means.

6. The system of claim 1, wherein:
   a first programming cell of said plurality of programming cells is a start-up cell which must receive a predetermined signal at its latch means before programming of any of the remaining programming cells is commenced.

7. The system of claim 6, wherein:

a last programming cell of said plurality of programming cells is a stop programming cell which receives a predetermined signal only when all of the preceding programming cells have been programmed.

8. The system of claim 7, wherein:
programming cells which are connected to and located between said start-up cell and said stop-programming cell are used to electronically program an address and an input/output configuration for said input/output connector module.

9. The system of claim 2, wherein said clamping means further comprises:
a NAND logic gate whose inputs are connected to the output of said latch means and said enabling means and whose output is connected to said bus.

10. The system of claim 2, wherein said enabling means further comprises:
an AND logic gate, whose input is connected to an enable signal and said bus, and whose output is connected to said latch means; and
a NAND logic gate whose input is connected to said enable signal and said latch means, and whose output is connected to said bus.

11. The system of claim 1, wherein said delay means comprises resistance within said bus and a capacitor connected to said bus.

12. The system of claim 2, wherein said latch means further comprises a D flip-flop, whose D input and clock input are connected to said bus, and whose Q output is connected to said clamp means.

13. The system of claim 12, wherein the latch means further comprises a shift register, connected to said flip-flop, and whose output is connected to said bus.

14. A method of transmitting programming signals to a plurality of input/output connector modules located serially along a bus, each connector module of said plurality of connector modules having a plurality of programmable cells, said method comprising the steps of:
a) enabling each of said cells in one module to accept programming signals from a serial input data line;
b) clamping said serial input data line to ground out said programming signals after each cell has been programmed;
c) delaying said programming signals from reaching another module downstream of said one module for a delay time period which is at least as great as the time required to program each cell; and
d) repeating steps a, b, c for each remaining programmable cell of said plurality of programmable cells in each module.

15. The method of claim 15, further comprising the step of:
latching said programming signal by latch means located within each cell in order to store said programming signal.

16. The method of claim 15, further comprising the step of:
resetting each programmable cell of said plurality of programmable cells by resetting said latch means.

17. The method of claim 15, further comprising a step of determining whether said plurality of programmable cells have correctly latched said programming signal and resetting said plurality of programmable cells if said cells have incorrectly latched said programming signals.

* * * * *